US006667704B1

(12) United States Patent
Grale et al.

(10) Patent No.: US 6,667,704 B1
(45) Date of Patent: Dec. 23, 2003

(54) DATA CONVERSION CIRCUITS AND METHODS WITH INPUT CLOCK SIGNAL FREQUENCY DETECTION AND MASTER MODE OUTPUT CLOCK SIGNAL GENERATION

(75) Inventors: Trenton John Grale, Bastrop, TX (US); Jason Powell Rhode, Austin, TX (US); Karl Thompson, Converse, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 10/281,715

(22) Filed: Oct. 28, 2002

Related U.S. Application Data

(63) Continuation-in-part of application No. 09/929,917, filed on Aug. 15, 2001.

(51) Int. Cl.[7] .............................. H03M 1/00; G06F 1/04
(52) U.S. Cl. ......................... 341/123; 341/122; 341/61; 713/500
(58) Field of Search .................... 341/141, 61, 155, 341/122, 123; 713/500; 381/58

(56) References Cited

U.S. PATENT DOCUMENTS

| | | | | | |
|---|---|---|---|---|---|
| 3,912,869 | A | * | 10/1975 | Ullakko | 341/54 |
| 4,803,437 | A | * | 2/1989 | Reusens | 327/115 |
| 5,245,593 | A | * | 9/1993 | Yamate | 368/156 |
| 5,260,705 | A | * | 11/1993 | Inukai | 341/155 |
| 5,444,708 | A | * | 8/1995 | Shimizu | 370/347 |
| 5,598,447 | A | * | 1/1997 | Usui | 375/376 |
| 5,774,702 | A | * | 6/1998 | Mitsuishi et al. | 713/501 |
| 5,793,819 | A | * | 8/1998 | Kawabata | 375/344 |
| 6,128,045 | A | * | 10/2000 | Anai | 348/556 |
| 6,219,797 | B1 | * | 4/2001 | Liu et al. | 713/500 |

* cited by examiner

*Primary Examiner*—Peguy JeanPierre
(74) *Attorney, Agent, or Firm*—James J. Murphy; Winstead Sechrest & Minick P.C.

(57) ABSTRACT

A data converter includes first and second input signal paths receiving an input signal having an input frequency, the first input signal path dividing the input frequency by a first divisor and the second input signal path dividing the input frequency by a second divisor, the second divisor being greater than the first divisor. A selector selects between an output of the first input signal path and an output from the second input signal path in response to a state of a control signal. Control circuitry monitors a selector output signal frequency and a current state of the control signal and selectively resets the state of the control signal to set the selector output frequency to a desired frequency.

20 Claims, 14 Drawing Sheets

DATA CONVERSION CIRCUITS AND METHODS WITH INPUT CLOCK SIGNAL FREQUENCY DETECTION AND MASTER MODE OUTPUT CLOCK SIGNAL GENERATION

CROSS REFERENCE TO RELATED APPLICATIONS

This application for patent is a continuation-in-part of related to the following applications for patent:

U.S. patent application Ser. No. 09/929,917, filed Aug. 15, 2001 by Itani and Rhode, entitled "FREQUENCY DETECT CIRCUIT FOR DETERMINING SAMPLE SPEED MODE OF DECODED AUDIO INPUT DATA STREAMS" currently pending.

FIELD OF INVENTION

The described embodiments lie generally in the field of digital audio coding and decoding and in particular to data conversion circuits and methods with automatic input signal detection and master mode output clock generation.

BACKGROUND OF INVENTION

Audio support is provided for many modern computer, telephony, and other electronics applications. An important component in many digital audio information processing systems is the Pulse-Code Modulated ("PCM") decoder. Generally, the decoder receives data in a compressed form and converts that data into PCM data. The decompressed digital PCM data is then passed on for further processing, such as filtering, expansion or mixing, conversion into analog form, and eventually into audible tones.

One form of compressed audio data is the S/PDIF format, which can be converted to PCM data with a digital audio receiver chip. The standard PCM data formats contain a high rate clock ("MCLK"), a sample rate clock ("LRCK"), which is used to select between the left and right channel data, a data signal ("SDATA") that contains signal information at the MCLK rate, and a sample signal ("SCLK"), which latches in the data signal. This method allows audio samples with various sample rates and bits per sample to be input to Digital-to-Analog Converters ("DACs") in a serial fashion.

Sampling rates of 48 kHz, 96 khz, and 192 khz are common and will be referred to in this specification as single-speed, double-speed, and quad-speed sampling modes, respectively. To convert the PCM data properly, DACs must be set to sample the incoming data at the proper rate. In the prior art, DACs have used programmed bits in a register or have used external pin settings to set their properties according to the speed sampling mode of the incoming PCM or other input format data stream.

SUMMARY OF INVENTION

The principles of the present invention are embodied in circuits, methods and systems, which utilize automatic frequency detection to selectively generate clock signals of selected frequencies from a single input signal. According to one particular embodiment, a data converter is disclosed which includes first and second signal paths receiving an input signal having an input frequency, the first signal path dividing the input frequency by a first divisor and the second signal path dividing the input frequency by a second divisor, the second divisor being greater than the first divisor. A selector selects between an output of the first signal path and an output from the second signal path in response to a state of a control signal. Control circuitry monitors a selector output signal frequency and selectively resets the state of the control signal to set the selector output frequency to a desired frequency. Additional embodiments of the inventive principles support the generation of one or more output signals of selected frequencies during master mode operations from the signal output from the selector.

Circuits, methods, and systems embodying the principles of the present invention advantageously allow for the detection of the frequency of a received signal and the automatic generation of internal clock signal having a frequency corresponding to an associated speed mode. During master mode operations, the internal clock signal is further divided in response to a minimal number of mode control signals to generate one or more output clock signals of frequencies corresponding to the speed mode. Hence, a single received clock of a given frequency is provided and at least one output clock corresponding to the appropriate speed mode is output with minimal external control intervention.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIG. 1–17 of the drawings, in which like numbers designate like parts.

Figure 1:
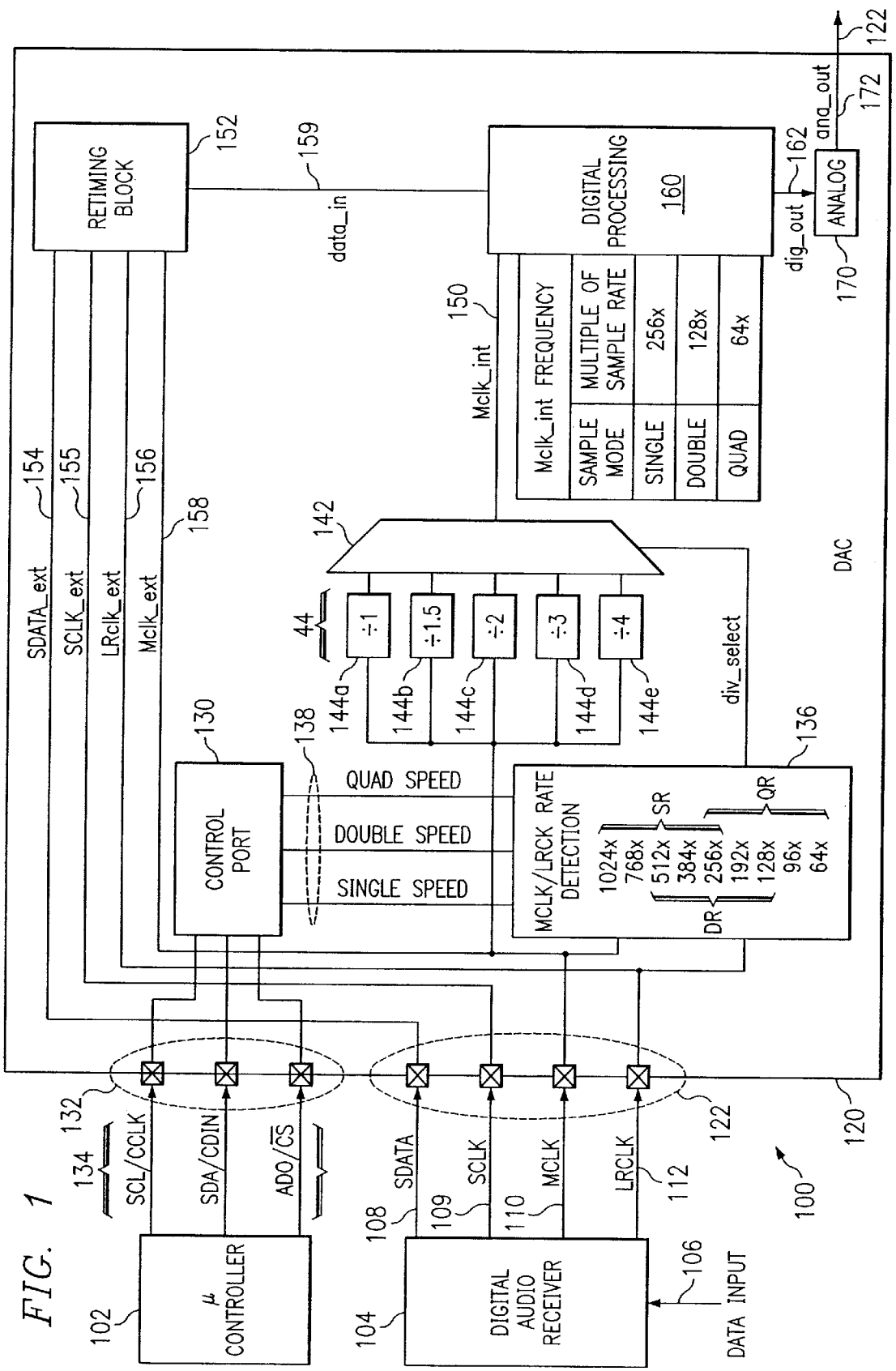
FIG. 1 is a block diagram of an audio digital-to-analog converter system which does not employ a frequency detection circuit for determining the sample speed modes of decoded audio input data streams.

FIG. 1 is a block diagram of an audio decoding and digital-to-analog converter circuit 100 which does not employ a frequency detection circuit for determining sample speed mode of decoded digital audio input data streams. Providing control is a microcontroller 102, which may be an 80C51 or similar microcontroller device. A digital audio receiver 104 is provided for receiving the encoded data input 106, which carries audio data and optionally control information associated with that audio data. The digital audio receiver 104 preferably provides a data output ("SDATA") 108, a signal for latching the data output ("SCLK") 109, and two cloak outputs ("MCLK," "LRCLK") 110, 112.

A data converter, which in a specific embodiment may be Digital-to-Analog Converter ("DAC") 120 is preferably connected to the microcontroller 102 and the digital audio receiver 104. The DAC 120 receives the data 108 along with the clock signals 110, 112, and it then operates to convert the decoded digital signal received from the digital audio receiver 104 into an analog output signal 122 provided at the analog output 172 of the DAC 120. The DAC 120 may alternatively be any type of data converter from which it is desirable to extract a sampling rate from an intrinsic digital stream. For example, the DAC or data converter 120 may alternatively be an ADC, CODEC, or other digital encoder or decoder.

To properly convert the received, decoded signal, which is received on the SDATA line 108, the DAC 120 must know the sampling speed mode that was used to encode the original analog signal. This sampling speed mode will be used to convert the decoded digital signal to an analog signal.

Still referring to FIG. 1, to provide the analog signal output 122, the DAC 120 samples the incoming digital audio data stream 108 at a certain rate based on the sample speed mode used. A control port 130 is also provided to interface with the microcontroller 102 through the control port interface 132. This microcontroller interface is necessary in particular if the DAC must be externally set to the proper sampling speed mode. The microcontroller provides control signals 134 to control the DAC 120 through the interface 132. The control lines 134 passing through the control port interface 132 are preferably used, in part, to inform the DAC of the speed sample mode being used for the unencoded data stream 108. In prior approaches such as this one, a user might set the DAC 120 for the correct speed sample mode through a programmed command to the microcontroller 102, or the microcontroller 102 might separately determine the speed mode from overhead bits in the incoming encoded data stream at digital audio receiver input 106.

Thus, in typical DACs not employing frequency detection circuits, a register or hardwired connections could be used to set the DACs into single-speed, double-speed, or quad-speed modes. Once the DAC 120 is configured to a certain speed mode (single, double, or quad), that information is then sent by the control port 130 to a MCLK/LRCK rate detection circuit 136 through lines 138.

The MCLK/LRCK ratio detection circuit 136 receives MCLK and LRCK signals 110,112, which are supplied to the DAC 120 from a digital audio receiver 104. Once MCLK and LRCK 110,112 are received, the ratio detection circuit 136 determines the ratio of MCLK to LRCK. That ratio and the speed-mode information is then used to determine the divide setting. Table 1, below, illustrates the details of the choice of divide based on MCLK-to-LRCK ratio and sample speed mode. The divide setting is operated as divide_select lines 140, which feed a divider multiplexer 142 to select one of multiple divided MCLK signals (shown as dividers 144 in FIG. 1).

TABLE 1

| Mclk/LRclk ratio | Single Speed | | Double Speed | | Quad Speed | |
| --- | --- | --- | --- | --- | --- | --- |
| | div | err | div | err | div | err |
| 1024x | 4x | 0 | 4x | 1 | 4x | 1 |
| 768x | 3x | 0 | 4x | 1 | 4x | 1 |
| 512x | 2x | 0 | 4x | 0 | 4x | 1 |
| 384x | 1.5x | 0 | 3x | 0 | 4x | 1 |
| 256x | 1x | 0 | 2x | 0 | 4x | 0 |
| 192x | 1x | 1 | 1.5x | 0 | 3x | 0 |
| 128x | 1x | 1 | 1x | 0 | 2x | 0 |
| 96x | 1X | 1 | 1x | 1 | 1.5x | 0 |
| 64x | 1x | 1 | 1x | 1 | 1x | 0 |

The output of the dividers 144, which by example are shown as ÷1 (144a), ÷1.5 (144b), ÷2 (144c), ÷3 (144d), ÷4 (144e), are fed into a multiplexer 142, which selects from among the divider outputs to provide an internal MCLK signal ("MCLK_int") signal 150. The MCLK signal goes to the internal digital processing circuitry 160. In the example shown, despite the varying MCLK frequency, the internal MCLK frequency will be the same for single-speed (48 kHz), double-speed (96 kHz), and quad-speed (192 kHz) sampling. In this example, the MCLK_int 150 frequency will be 12.288 MHz. The internal frequency is fixed for these different sampling rates, because while the MCLK frequency increased by factors of 2 from single- to double- to quad-speed modes, so does the divide setting.

Still referring to FIG. 1, a retiming circuit 152 is provided as the interface to the incoming data SDATA_ext 154 and latch signal SCLK_ext 155. The LRCK and MCLK signals are provided to the connections of the DAC 120 through signal lines LRCK_ext 156 and MCLK_ext 158, respectively. The retiming circuit 152 receives and formats the incoming signals 154, 155, 156, 158, and provides the signal "data_in" 159 for handling by the digital processing circuit 160, which also receives the MCLK_int signal 150 from the divider 142.

The digital-processing block converts the incoming digital data to a decoded digital data signal, "dig_out" 162. A final analog signal circuit 170 receives the "dig_out" signal 162 and generates an analog signal 172 from that incoming decoded digital data signal. The analog signal circuit 170 is preferably a switched-capacitor DAC and filter circuit.

Figure 2:
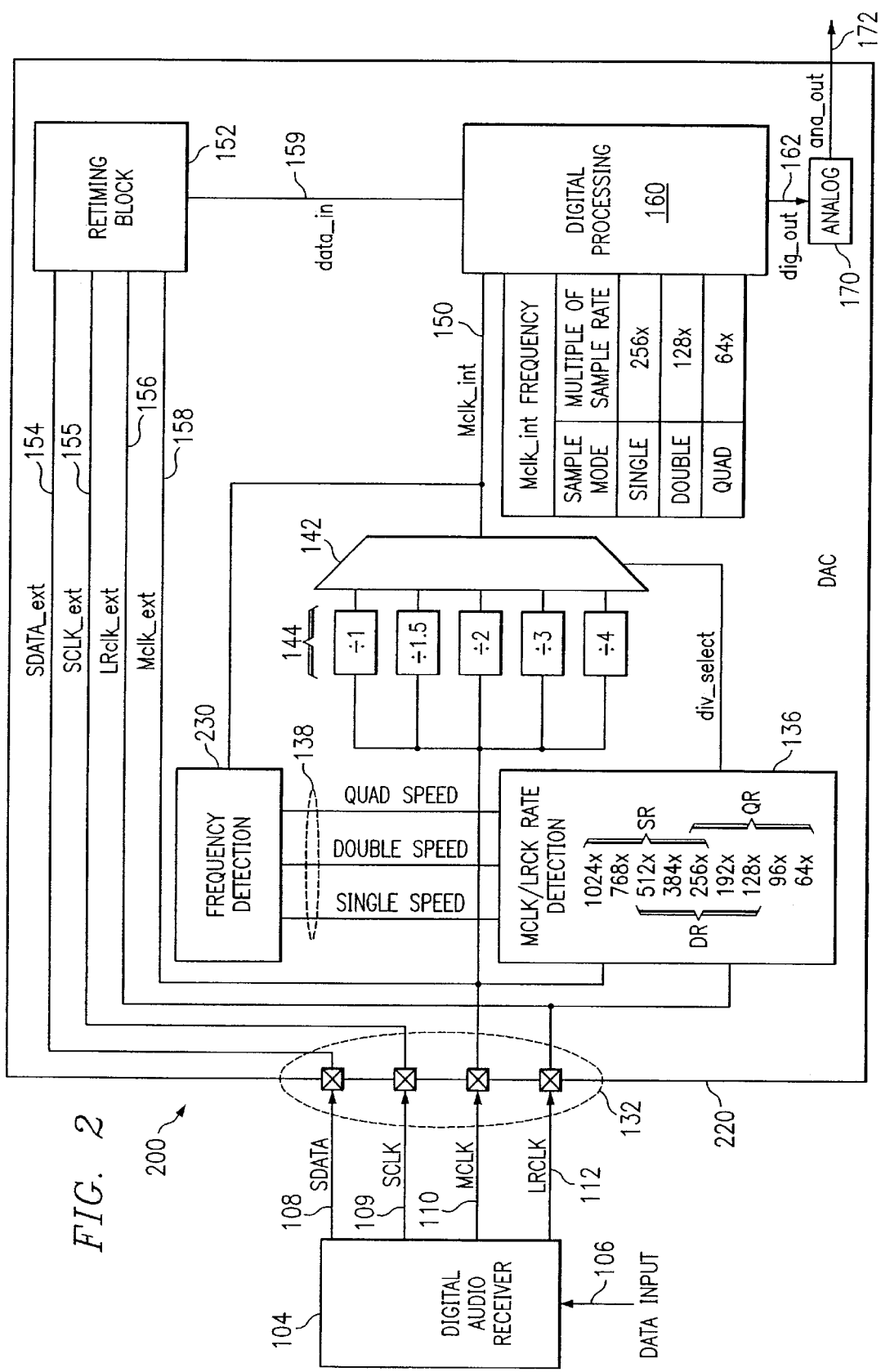
FIG. 2 is a block diagram of an audio digital-to-analog converter system having a frequency detection circuit.

FIG. 2 is a block diagram of an audio decoding circuit 200 having a DAC circuit 200 incorporating a frequency detection circuit 230. This audio decoding circuit 200 operates in a similar fashion to the circuit 100 of FIG. 1, but the frequency detection circuit 230 is used to automatically select the speed mode. This automatic selection of speed mode frees the user from manually setting the speed mode.

The DAC 200 receives an audio stream of SDATA 108, SCLK 109, MCLK 110, and LRCK 112 from the digital audio receiver 104. Depending on intrinsic characteristics of the incoming clock and data stream, such as the frequency of MCLK 110 and the MCLK to LRCK ratio, the frequency detection circuit 230 automatically selects the correct speed mode.

Figure 3:
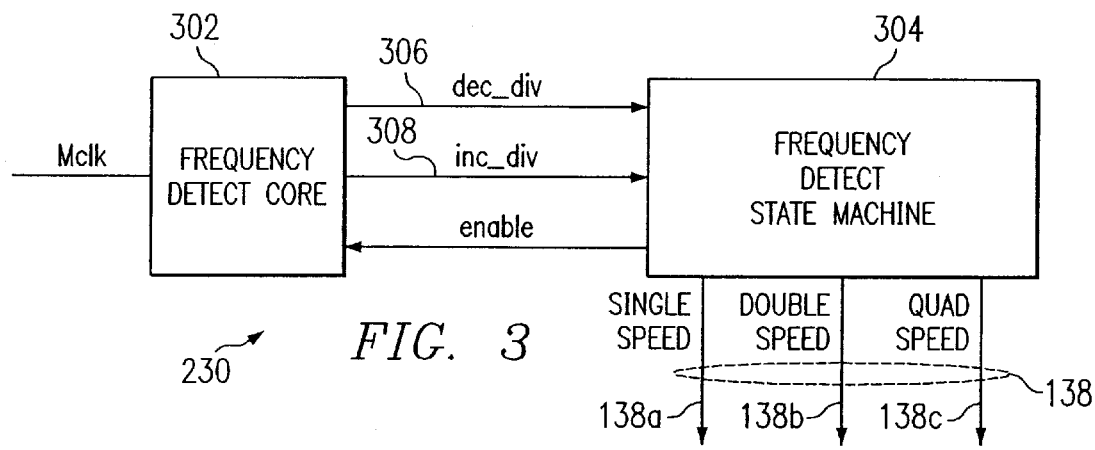
FIG. 3 is a circuit diagram of internal circuitry that can be used for the frequency detection circuit of FIG. 2.

FIG. 3 shows internal circuitry that can be used to implement the frequency detection circuit 230. The frequency detection circuit 230 is preferably comprised of a core frequency detection block 302 and a frequency detection master state machine 304. The job of the core frequency detection circuit 302 is to determine if MCLK_int 150 is at the correct frequency, or if the frequency is too high or low. The circuit 302 outputs a dec_div signal 306 if the frequency of MCLK_int 150 is too low or an inc_div signal 308 if the frequency of the $MCLK_{13}$ int signal 150 is too high. Otherwise, both signals 306, 308 are set low indicating that the correct frequency is detected.

The master state machine 304 runs through a sequence of events and determines what speed mode to set based on the inputs 306, 308 from the frequency detect core 304. Preferably, signal lines 138 comprise 3 lines, one each indicating alternatively that the speed mode is single, double, or quad. Alternatively, these speed modes could be indicated by a pair of lines, b1& b2, where b1b2=01 for single-speed mode, b1b2=10 for double-speed mode, and b1b2=11 for quad-speed mode. Other protocols for indicating the speed mode by the master state machine 304 are also possible.

Figure 4:
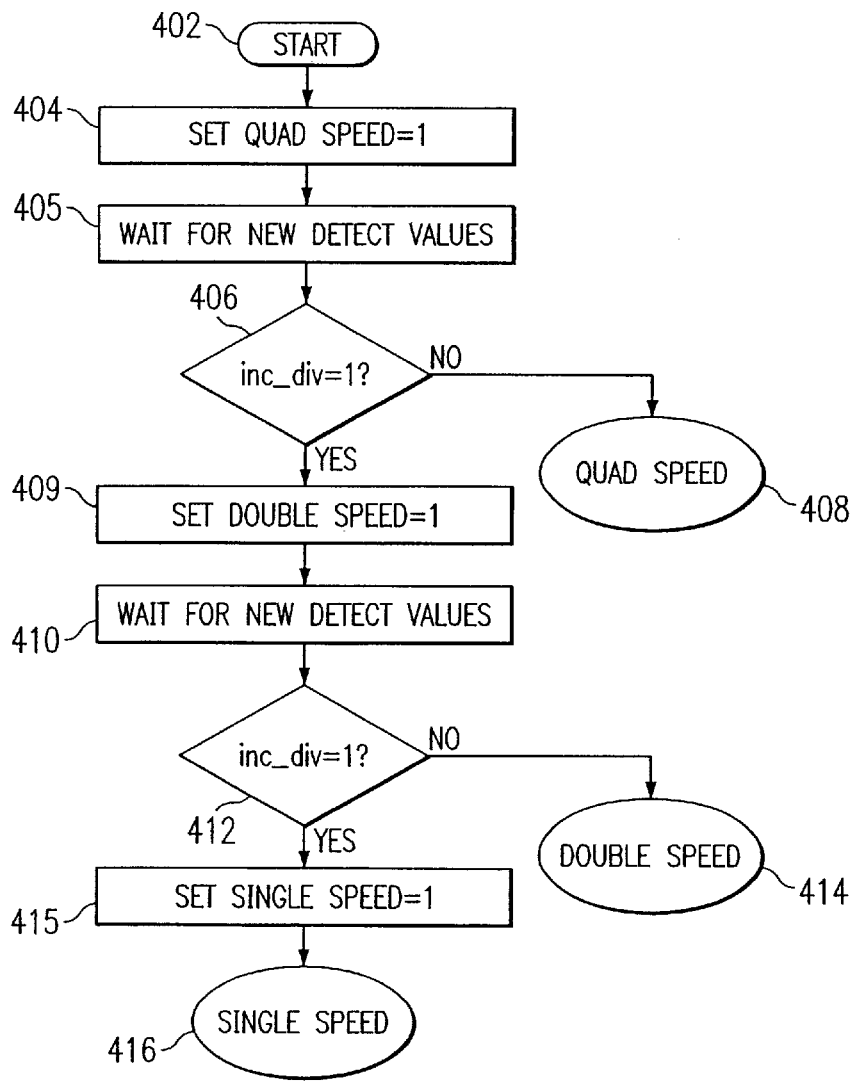
FIG. 4 is a flow chart of one possible implementation of a frequency detection master state machine within the internal circuitry of FIG. 3.

FIG. 4 is a flow chart of one possible implementation of the frequency detection master state machine 304. This method begins at the start block 402 to initiate a sequence of events that will result in the proper determination of the speed mode. The implementation shown here uses a single pass to determine the correct speed mode and only uses the inc_div output 308 of the frequency detection core block 302 (see FIG. 3).

At block 404, the master state machine 304 sets "quad speed" as its initial assumption. The state machine 304 waits for a predetermined period at block 405 to allow (e.g., inc_div 308) to settle. At decision block 406, the master state machine 304 tests the inc_div signal 308 to see if it is asserted (i.e., "1"). If the inc_div signal is not asserted, then the initial assumption of quad-speed mode was the correct one and the state machine goes to block 408, continuing with the DAC 200 in quad-speed mode. If the inc_div is asserted, however, then the initial quad-speed assumption was incorrect. The state machine 304 accordingly proceeds to block 409, whereupon the speed mode is set to double speed. At block 410, the state machine 304 again waits for the detect values to settle. From block 410, the state machine 304 proceeds to decision block 412 to re-test the inc_div signal 308. If the inc_div is not asserted, then the double-speed mode assumption will be the correct one, and the state machine will proceed to block 414, leaving the mode set to double speed. If, however, the inc_div signal 308 is asserted, the state machine 304 sets the speed mode to the only remaining state, which is single-speed mode, at block 416.

Figure 5:
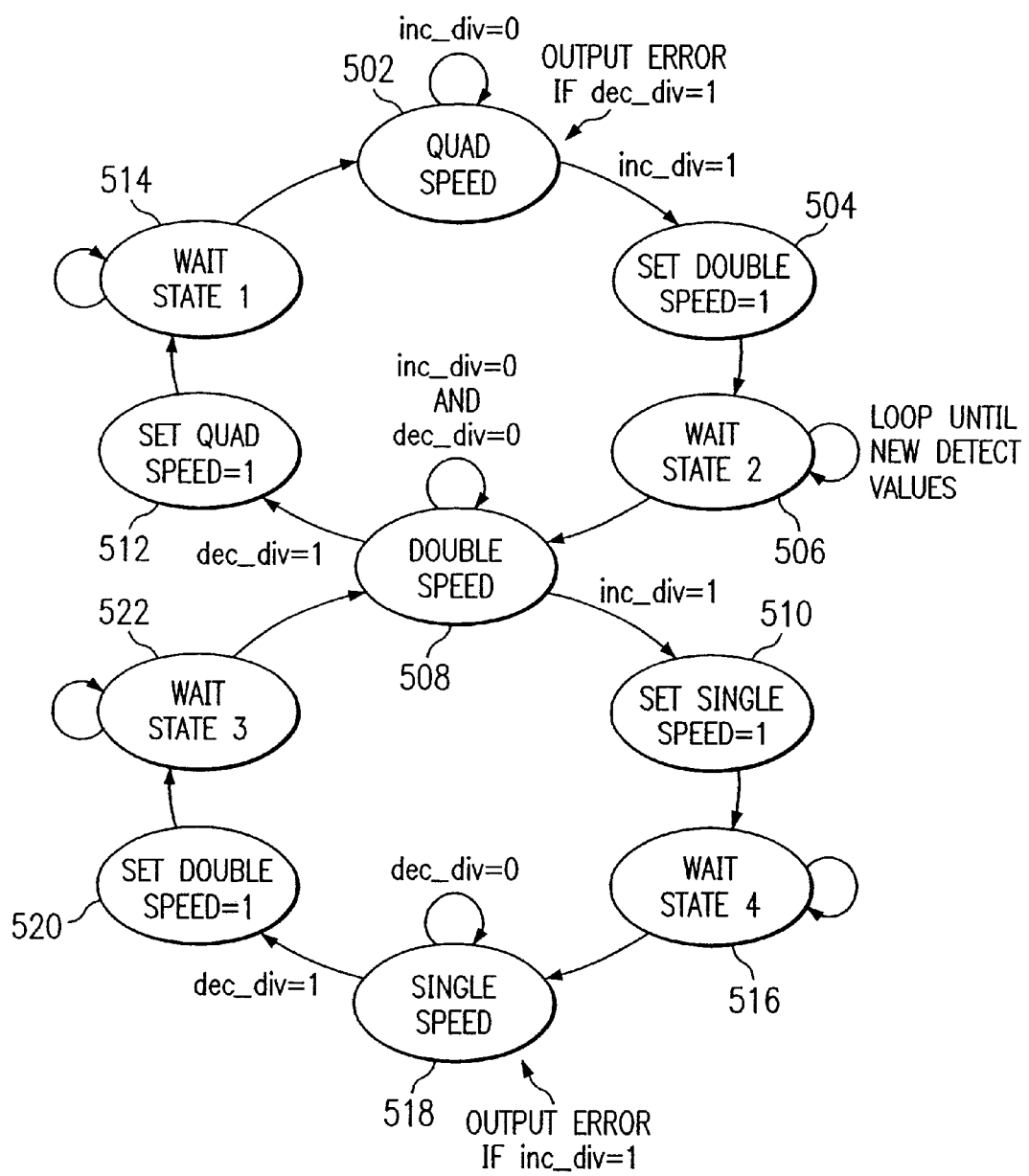
FIG. 5 is a state diagram of another possible implementation of the frequency detection master state machine within the internal circuitry of FIG. 3.

A state diagram of another possible implementation of the master state machine is shown in FIG. 5. This implementation uses inc_div 308 and dec_div 306 signals out of the frequency detect core circuit 302 (see FIG. 3) to provide a continuous speed-mode detection scheme. This method preferably does not use a start signal and is always active. The embodiment described in FIG. 4 has the advantage of being simpler and allows the option of turning off the frequency detect block after done with detect. This embodiment, on the other hand, has the advantage of providing continuous frequency detection so that no start signal is needed and any error will eventually settle out to the correct value.

The state diagram of FIG. 5, as mentioned above, is a continuously operating process. Picking block 502 as the beginning spot for this discussion, the state machine has set the DAC 200 in quad-speed mode, and the state machine stays at block 502 so long as inc_div 308 is not asserted (i.e., "0"). While in this mode, the state machine 304 asserts an output error status if dec_div=1, and moves on to block 504 if inc_div=1 or becomes asserted.

At block 504, the state machine asserts the double speed output 138b from the state machine 304. The operation then proceeds to block 506, which is a wait state. At block 506, the state machine enters into a loop until new detect values are detected, or in other words until the values inc_div and/or dec_div settle.

Once the state machine exits state 506, it proceeds to state 508, which is the static position for double speed operation. The state machine remains at block 508 so long as inc_div and dec_div both equal zero. If inc_div goes high (to "1"), the state machine moves operation to state 510, whereupon it sets the speed mode of the device to single speed. If, on the other hand, the dec_div signal becomes asserted, the operation of the state machine 304 proceeds instead to state 512, where the machine is again set in quad-speed mode operation. From state 512, the state machine 304 enters wait state 514, where it remains until the detect values have an opportunity to settle, whereupon operation of the device returns to quad-speed operation at state 502.

Regarding state 510, which was the state at which the single speed mode was set after operation in the double-speed mode, the machine's operation proceeds to state 516, which is a wait state that continues again until the new detect values settle. From state 516, the device enters static operation in the single-speed mode at state 518. At this state, an error signal is output if inc_div equals one, operation continues so long as dec_div equals zero, and operation proceeds to state 520 if dec_div equals one. At state 520, the device again settles to double-speed mode by the appropriate output from the state machine 304. From this state, the device operation goes to state 522, which is a wait state in which the device remains until the new detect values have settled. From state 522 the device operation returns to the static double-speed state at block 508.

Figure 6:
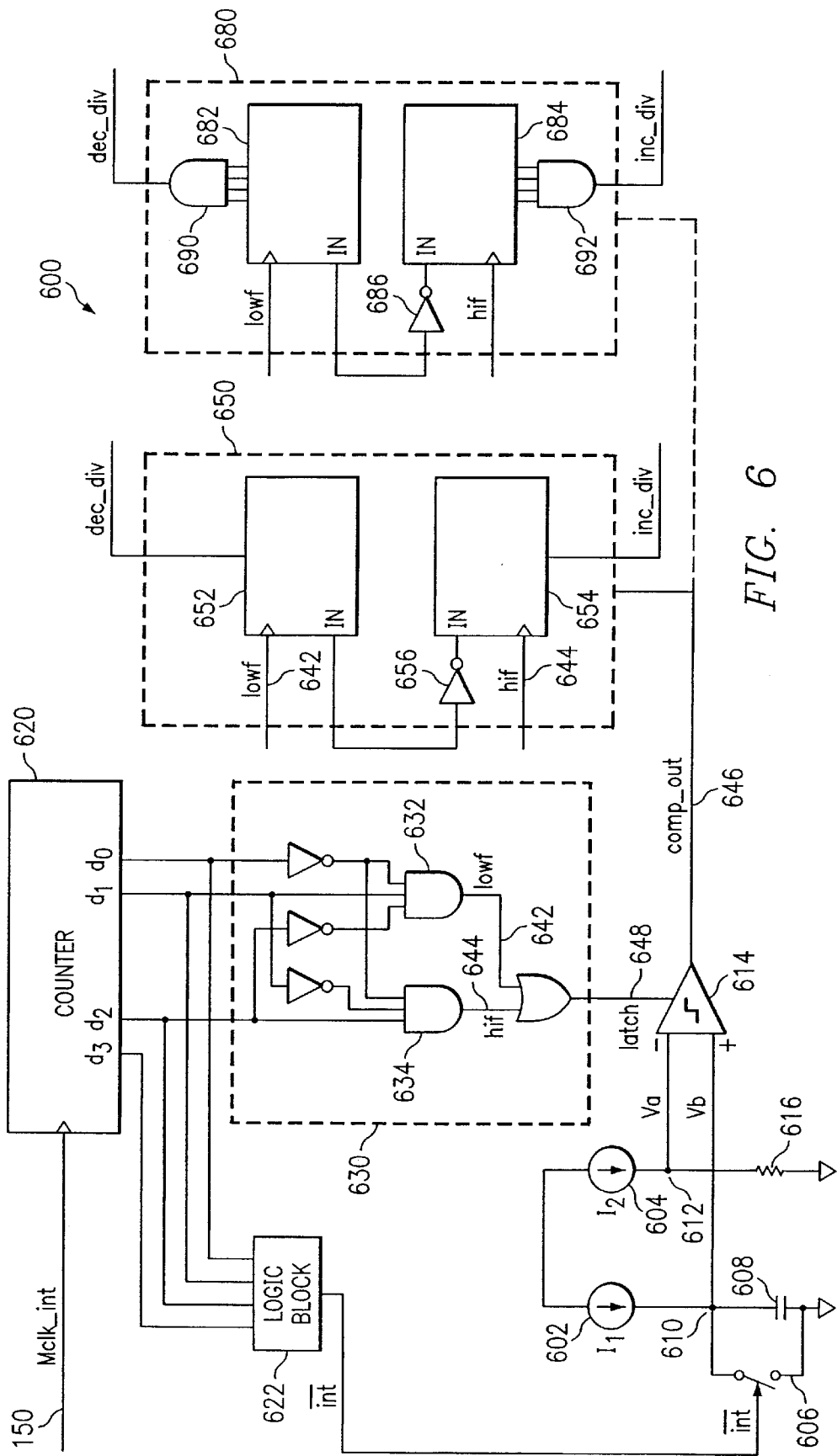
FIG. 6 is a schematic of one implementation of an analog part of the frequency detection core shown in FIG. 3.

FIG. 6 illustrates in schematic form one implementation of the analog part 600 of the frequency detection core 302 (see FIG. 3). This circuit operates to detect whether the received Mclk_int signal 150 is operating at the correct frequency. Circuit 600 contains two current sources I1 602 and I2 604. I1 is either directed to ground through a switch 606 when the "integrate" signal int_607 is high, or through the capacitor 608 when int_607 is low.

The int_signal 607 operates to reset the counter 620 and momentarily short capacitor 608 to ground by closing switch 606, thereby discharging the capacitor 608. The period assertion of the int_signal is provided by the circular counter 620, operating in conjunction with logic block 622.

Figure 7:
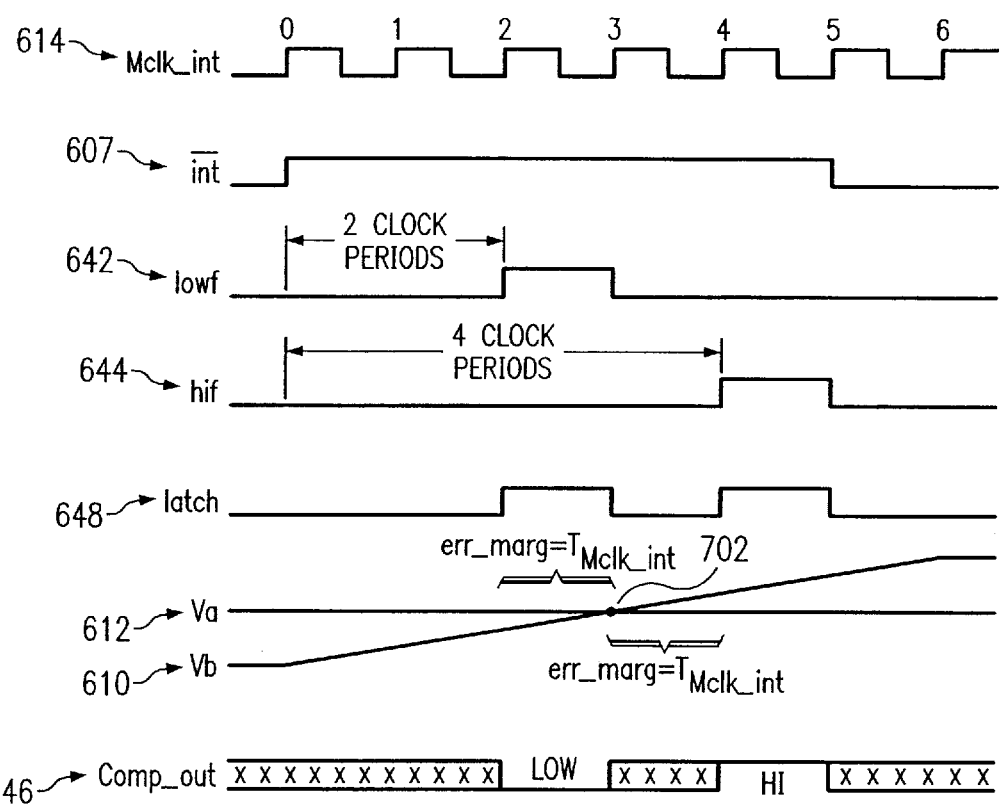
FIG. 7 is a timing diagram showing the signals at relevant nodes of the FIG. 6 circuitry when the internal MCLK signal is set for the correct speed.
Figure 8:
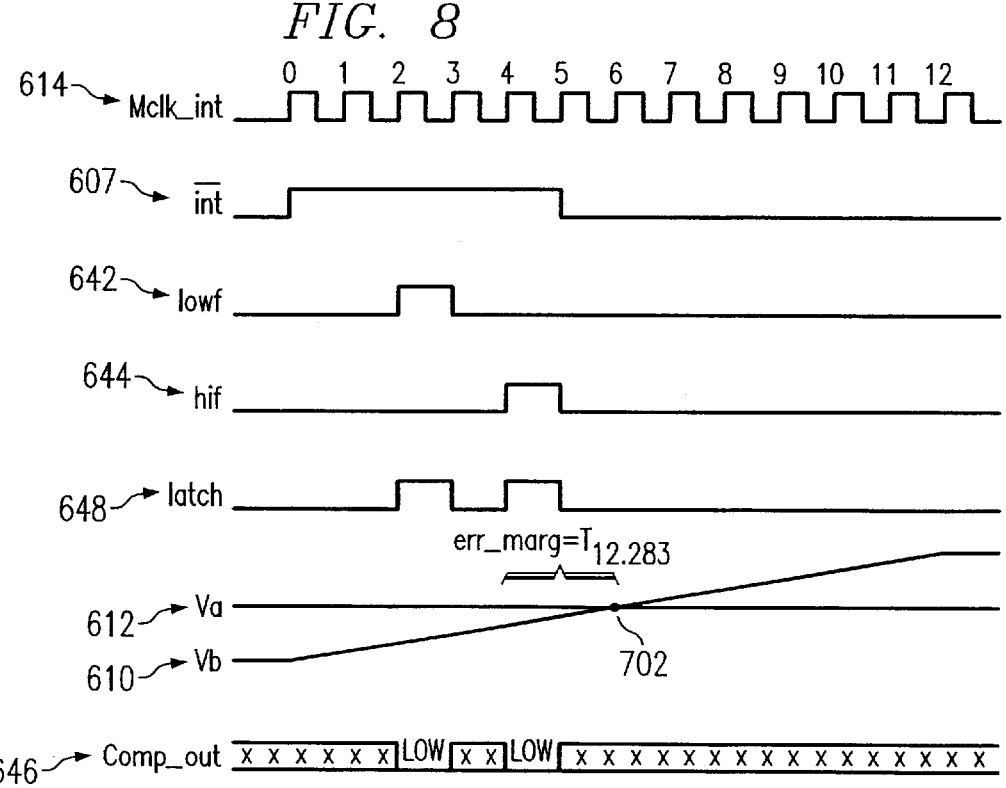
FIG. 8 is a timing diagram showing the signals at relevant nodes of the FIG. 6 circuitry when the internal MCLK signal is set at too high a speed.

The logic block 622 provides for an unasserted int_607 for clock periods zero through five, inclusive (see FIGS. 7–8). The logic block 622 then asserts int_607 for periods 6–7, thereby discharging capacitor 608 during that time period by closing switch 606. Once the counter 620 begins its count again at zero, which in this embodiment using a 4-bit counter will be after the seventh cycle, the switch 606 is again opened. The opening of switch 606 allows the current from I1 to again flow into capacitor 608, which forms a linearly-increasing voltage on node 610 ("Vb") that will ramp at the rate I1/C. The current from I2 604 is passed through resistor 616 to generate a constant voltage on node 612 ("Va")=I2*R.

Still referring to FIG. 6, the comparator 614 compares the ramp voltage Vb on node 610 to the constant voltage Va on node 612 and generates a compare signal, comp_out 646 when the ramp voltage Vb exceeds the constant voltage Va. The signal hif and lowf are generated by the counter 620 along with associated logic gates 630. The specific circuits used are exemplary, and the function described in this embodiment is one of providing a lowf signal 642 at a first fixed number of MCLK_int cycles after the int signal 607 is low-asserted and a hif signal 644 at twice that fixed number of MCLK_int cycles. The OR gate 632 passes both of those pulses through as signal "latch" 648 to the latching comparator 614.

The thresholds set for triggering the hif and lowf signals 610,612 are such that if the frequency of MCLK_int 150 has been correctly set by the frequency detection circuit 230 along with the rate detection circuit 136, the voltage of Vb will cross the voltage on Va after lowf goes high but before hif goes high. This sequence will produce a "low" and then a "high" out of the comparator 614, and the transition occurring between assertion of the hif and lowf signals 610,612 will indicate that the correct frequency of MCLK_int 150 has been detected.

If the comp_out signal 646 is low at the hif trigger point, the frequency is too high and the ratio used by divider 142/144 should be increased (see FIG. 8). Accordingly, the inc_div signal 308 is asserted by the frequency detection core 302, and the state machine 304 will then assert the corresponding speed-mode signal 138 such that the rate detection circuit 136 will set the division of the MCLK to the appropriate higher factor division. If the comp_out signal 646 is high at the lowf trigger point, then the frequency is too low and the ratio used by the divider 142/144 should be decreased (see FIG. 7). Accordingly, the dec_div signal 306 is asserted by the frequency detection core 302, and the state machine 304 will assert the corresponding speed-mode signal 138 such that the rate detection circuit will set the division of the MCLK to the appropriate lower factor division.

Still referring to FIG. 6, alternative or complementary latching structures 650, 680 are provided to sense from the comp_out signal 646 whether the Mclk_int signal 150 is at the correct frequency. Latching structure 650 includes a low frequency latch 652, which latches in the state of the comp_out signal 646 at the rising edge of the lowf signal 642. If the comp_out signal 646 is low at the time hif triggers, the Mclk_int signal 150 frequency is too high, as discussed above. In this situation, a "high" voltage, which is the inverted comp_out signal at the time of triggering, will have been latched into 654, and accordingly its "inc_div" output signal 308 will be positively asserted. If, on the other hand, the comp_out signal 646 is high when lowf triggers, the Mclk_int signal 150 frequency is too high, as discussed above. In this situation, the inverter 656 inverts the comp_out signal, such that a "high" voltage is latched into register or latch 654 when hif triggers that input, and accordingly an "inc_div" output signal 308 will be positively asserted. If, in the third situation, the comp_out signal 646 is low when the lowf signal 642 triggers and high when the hif signal 644 triggers, the operating frequency of the Mclk_int signal 150 is correct, and neither the inc_div 308 or dec_div 306 signals will be asserted.

The alternative latching structure 680 operates much as latching structure 650, except that a shift register is provided in effect to latch and shift in the comp_out signals over several cycles of the compare signal, comp_out 646, which begins its period with each assertion of the int_signal 607. In this embodiment, only if the inc_div or dec_div signals described above would have been asserted four consecutive times (using the structure 650 approach) would the inc_div 308 or dec_div 306 signals be positively asserted in this approach. Thus, only if the consistent states of the compare signal, comp_out, would have been asserted or deasserted consistently, would the "averaged" inc_div 308 or dec_div 306 signals have been asserted. This "averaging" is provided by logic circuits, which in this case are multiple-input AND gates 690, 692 which require a consistent high output from each of the outputs of the shift registers 682, 684 before asserting the inc_div 308 or dec_div 306 signals.

Either or both of the alternative latching structures 650, 680 could be used in a system to generate the inc_div 308 and dec_div 306. The circuitry of FIG. 6 can also be calibrated to enable more accurate detection of the sampling rate. As examples, resistor 616 can be implemented as a variable resistor, or a variable resistor or a network of tuning resistors can be placed in parallel with resistor 616. Capacitor 608 can be implemented as a variable capacitor, or a variable capacitor or a network of tuning capacitors can be placed in parallel with capacitor 608. Either or both of the current supplies 602, 604 can be made variable current supplies. By making at least one of these components variable, the threshold voltage or ramp voltage can be adjusted to more accurately determine the sampling rate.

FIG. 7 is a timing diagram showing the signals at relevant nodes of the FIG. 6 circuitry when the Mclk_int signal 150 is set for the correct speed. In this timing diagram, the int_signal 607 resets the counter 620 at the counter's "reset" input (see FIG. 6). The counter then increases in a digital binary pattern, with its bit pattern (d2d1d0) increasing with each Mclk_int cycle as follows: 000, 001, 010, 011, 100 . . . . Thus, upon being reset by the int signal 607, the bit pattern goes to "001" at the first rising edge after the reset. This rising edge is marked by a "1" above the Mclk_int signal. At the second rising edge, the bit pattern goes to "010" at the point marked by a "2" above the Mclk_int signal in FIG. 7. The logic gates 630 detect the pattern "010" by the three-input AND gate 632, which then generates the lowf signal 642.

Still referring to FIG. 7, the hif trigger point is provided at the fourth clock cycle of Mclk_int 150. The bit pattern from the counter at the fourth clock cycle will be "100." Three-input AND gate 634 is provided to detect this condition and to generate at its output the hif signal 644. The "latch" signal 648 is simply the OR of both the lowf and hif signals 642, 644. As discussed above, the Vb signal 610 linearly increases with time until it crosses the Va reference signal 612.

The crossover point 702 provides a relatively fixed time frame of reference against which to count the lof and hif cycles. The comparator 614 digitizes this reference point, latching the signal in with the rising edges of lowf and hif. The output of the comparator, "comp_out," 646 is latched in FIG. 7 first at a "low" value when lowf transitions, and is then latched at a "high" value when hif transitions.

The accuracy of the reference crossover point 702 will however, vary according to device parameters and variations in the MCLK frequency from its expected value. The embodiment described can accommodate these variations. With further reference to FIG. 7, the error margin, "err_marg" is shown on either side of the crossover point 702 as the period of the Mclk_int signal 614. The time value of this error margin is shown as "TMclk_nt." This error margin comes into play because, as will be discussed below, the ramp rate of the Vb signal is dependent on the value of the capacitor 608 (see FIG. 6) and the threshold voltage Va is dependent on the value of the resistor 616 (see FIG. 6). Thus, the optimal crossover point 702 can be designed to be exactly at the center between the rising edges of hif and lowf, but component variations can cause the crossover point to shift along the time axis. So long as the crossover point is not off by more than once cycle in the described embodiment as illustrated in FIG. 7, the circuit will still performed as designed to detect incoming Mclk_int frequencies that are either twice the correct frequency or half the correct frequency.

FIG. 8 is a timing diagram showing the signals at relevant nodes of the FIG. 6 circuitry when the Mclk_int signal 150 is set at too high a speed. In this instance, the rising edge of both lowf and hif will happen before Vb=Va and the output of the comparator ("comp_out" 646) will be low at both of those trigger points.

Figure 9:
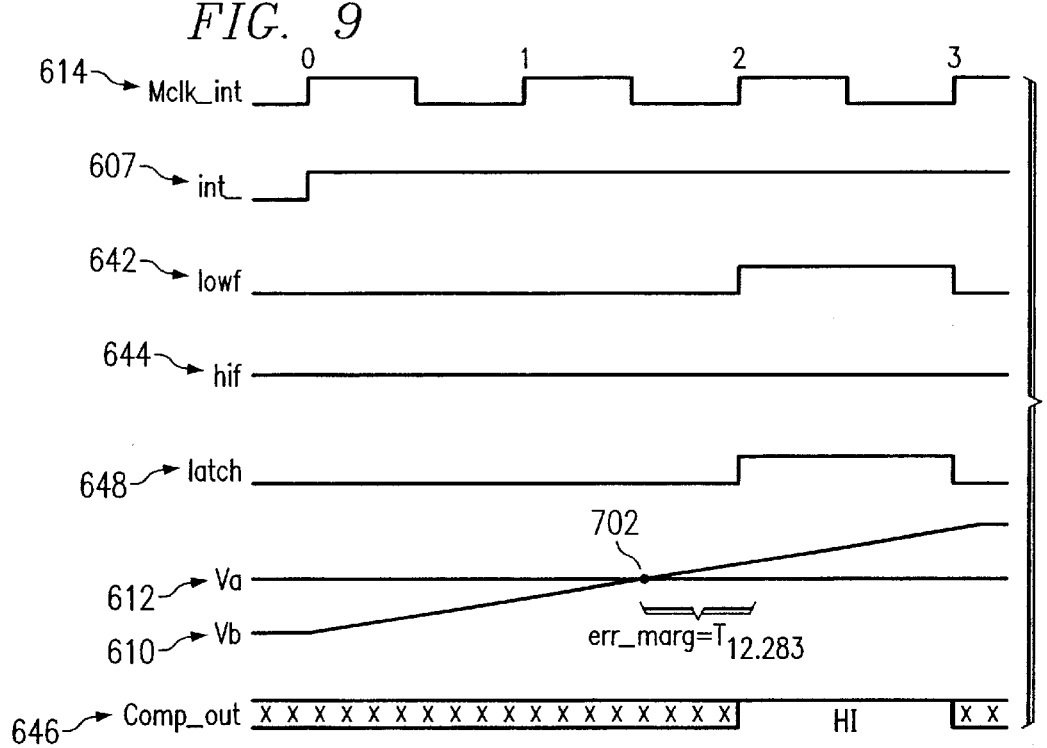
FIG. 9 is a timing diagram showing the signals at relevant nodes of the FIG. 6 circuitry when the internal MCLK signal is set at too low a speed.

FIG. 9 is a timing diagram showing the signals at relevant nodes of the FIG. 6 circuitry when the Mclk_int signal 150 is set at too low a speed. In this situation, Va 612 will cross Vb 610 before the rising edges of both lowf and hif 642, 644.

Figure 10:
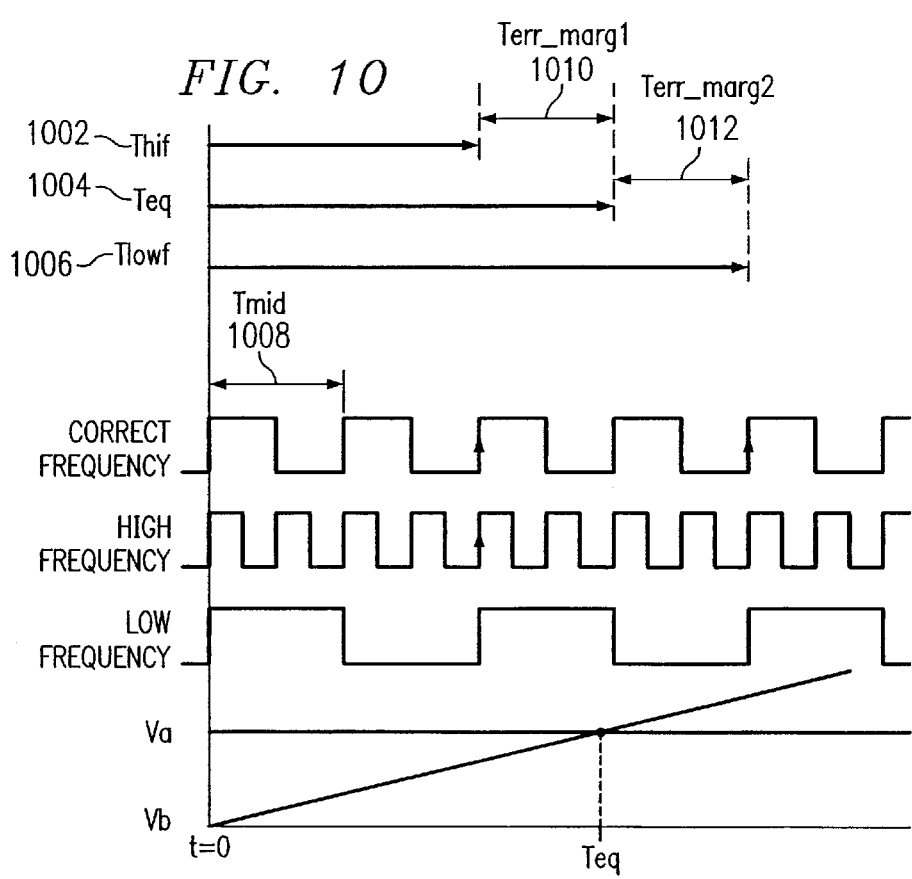
FIG. 10 is a timing diagram showing the effect of variations in frequency detection circuit component values.

FIG. 10 is a timing diagram illustrating the timing design trade-offs and margins of error to non-idealities in timing signals. For discussion purposes, FIG. 10 assumes a 48 kHz sampling rate for single-speed mode, 96 khz for double-speed mode, and 192 khz for quad-speed mode although as will be seen in FIG. 11 this is not always true in real applications. FIG. 10 shows the error margins, and for discussion of these error margins, the following terms are defined:

n = number of MCLK_int cycles from rising of int to rising of lowf latch signal.

Tmid = the period of MCLK_int when the correct speed mode is selected.

| | |
|---|---|
| $T_{hif}$ (1002) = | the time between the rising edge of int and the rising edge of the lowf latch with the correct speed mode selected. |
| $T_{lowf}$ (1006) = | the time between the rising edge of int and the rising edge of the hif latch with the correct speed mode selected. |
| $T_{err\_marge}$ = | $T_{lof} - T_{hif}$ |
| $T_{eq}$ (1004) = | ideal crossing from rising edge of int to Va = Vb. |
| let $T_{err\_marge1}$ (1010) = | $T_{eq} - T_{lof}$ |
| let $T_{err\_marge2}$ (1012) = | $T_{hif} - T_{eq}$ |

To get the same error margin on each side of Teq 1004, Teq 1004 is preferably centered between Thif 1002 and Tlowf 1006. Thus,

| | |
|---|---|
| $T_{err\_marge1}$ (1010) = | $T_{err\_marge2}$ |
| $T_{eq}$ (1012) = | $1.5*n*T_{mid}$ |
| $T_{hif}$ (1002) = | $2*n*T_{mid}$ |
| $T_{lowf}$ (1006) = | $1*n*T_{mid}$ |
| $T_{err\_marg}$ = | $1*n*T_{mid}$ |
| $T_{err\_marge1}$ (1010) = | $0.5*n*T_{mid}$ |

Thus, this result for the error margin gives us a $T_{eq}$ 1012 that can have an error band of:

$$T_{eq}(1012)=1.5n*T_{mid}*(1\pm\tfrac{1}{3}) \text{ or } T_{eq}=T_{eq\_nom}\pm 33\%$$

$$I_1/C*T_{eq}=I_2*R$$

$$T_{eq}(1012)=I_2/I_1 \cdot R \cdot C$$

If these circuits are implemented in CMOS, the variation of R and C will most likely be the biggest sources of error. If errors are kept below approximately 33%, the circuit will operate to detect single speed, double speed, and quad speed currently. If C and R are independent random variables, standard deviations should add as squared to make up the variation in Teq.

Thus, with sampling rates of 48 kHz, 96 khz, and 192 khz, the circuit can tolerate capacitance and resistance to have a 3-sigma variation of +23% and still have a good yield, allowing the circuits to be generally implemented in a standard CMOS process.

Figure 11:
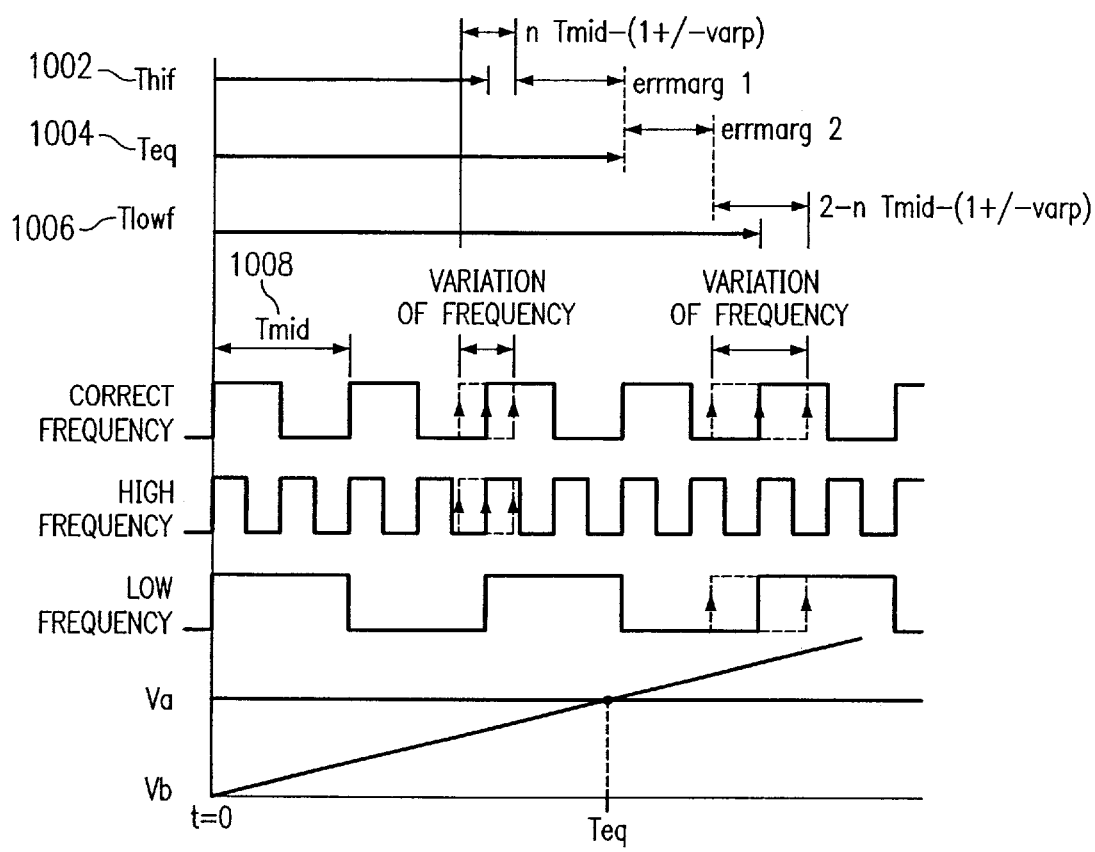
FIG. 11 is a timing diagram showing the effect of small variations in sampling frequency in addition to variations in frequency circuit component values.

Preferably, as shown in the timing diagrams of FIG. 11, the circuit will further provide for frequency variations. DVD audio sampling rates, for example, are shown in Table 2 within each speed mode.

TABLE 2

| Single Speed | Double Speed | Quad Speed | Factor of Max Rate |
|---|---|---|---|
| 32 KHz | 64 Khz | — | 0.667 |
| 44.1 kHz | 88.2 Khz | 176.4 Khz | 0.92 |
| 48 kHz | 96 Khz | 192 Khz | 1.0 |

A preferred frequency detection circuit supports all these various sampling rates. The frequency tolerance, however, would take up some of the allowance for component variation described above.

To account for this frequency variation, new equations with the small frequency variations at each sample speed mode are set forth below.

Tmid = the average period of MCLK_int when the correct speed mode is selected. This means the middle period of MCLK_int accounting for the max and min sampling rate variation.

varp = the ±percentage variation of the sampling frequency for a given sample speed mode.

| | |
|---|---|
| $T_{err\_marge}$ | = $T_{lowf\_min} - T_{hif\_max}$ |
| | = $2*n*T_{mid}*(1-varp) - n*T_{mid}*(1+varp)$ |
| | = $n*T_{mid}(1-3varp)$ |

Now, let Teq occur in the middle of Thif_max and Tlowf_min so that err-marg1=err_marg2. This way one error margin does not dominate and take away from the other error margin. So:

```
err_marg1 = err_marg2 = 1/2*n*Tmid(1−3*varp)
Teq      = Thif_max+err_marg1
         = n*Tmid*(1+varp)+1/2*n*Tmid*(1−3*varp)
         = 1.5*n*Tn,;d-n*Tm;d*varp
```

The timing diagram of FIG. 11 shows the small variation in sampling rate and the new error margins generated. From examination of the frequencies set forth in Table 2, the circuit will preferably accommodate a range of 0.667–1.0 in sampling frequency variation. This is equivalent to varp=±20%. This amount of variation yields an err_marg1 (1010)=0.2*n*Tmid (1008) and a Teq (1004)=1.3*n*Tmid (1008). Thus, the system can tolerate a ±15% variation in Teq (1004) and still be able to detect the speed mode correctly. This translates to ±10.6% variation in C and R.

Should the required limits on component value variation be unacceptable for the target process, a calibration approach can be used to achieve the desired component values. Alternatively, the 64 Khz sampling rate in double speed mode is very uncommon and support for this mode could be foregone. In that instance, the error margin then becomes much larger. Not supporting this mode, allows the system to accommodate a variation of only 0.92–1.0 in sampling frequency, or equivalently varp=±4.2%. This reduced variation gives an err_marg1 (1010)= 0.437*n*Tmid (1008) and a Teq (1004)=1.458*n*Tmid (1008). From this, it can be found that the system now tolerates a ±30% error in Teq 1004, which is equivalent to a ±21.2% variation in C and R. Current CMOS processes, for example, can generally accommodate this range of component variation. Thus, this system can now be used to detect and set speed modes for the most commonly used frequencies in digital audio. Digital audio stream standards have been developed to include various sampling speed-mode settings (single speed, double speed, quad speed).

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

For example, although AAC decoding is described as the digital audio decoding application above, but the principles described above can be applied to other formats of encoded digital audio data. Different functions described above may be implemented in hardware, software, or firmware. The described processing cores may be general purposes microprocessors or Reduced Instruction Set Computers ("RISC"), the latter of which would specifically include DSPs.

Further, the principles described above can be applied to other data conversion or decoding circuits, or other audio chips, having available incoming clock signals as described above. For example, the above frequency detection and automatic sample rate mode selection can be performed in chips which are in a slave mode where their internal sample rates are determined by external clocks being supplied to those chips. Such data conversion or decoding chips often process data in different ways depending on whether the data had been sampled in single speed, double speed, or quad speed mode, for instance. Traditionally, the user supplied this sampling speed mode information to the chip when switching to a different sampling speed mode. However, with the frequency detection circuit described above, the sampling sample speed mode setting may be determined automatically from the external clocks provided to the chip.

Accordingly, in an analog-to-digital converter ("ADC") embodiment, even though the data is not supplied to the chip in that mode, SCLK, MCLK, and LRCK signals may still be provided to an ADC chip or circuit that is operated in slave mode. In this case, the LRCK signal is used for the sample rate of the ADC. The approach described above can accordingly be used for the ADC in the same manner as described for the DAC.

The approach described above can also be used with a CODEC that is in slave mode. For a CODEC, the data can be supplied to the DACs or sent out from the ADCs, but the incoming clock signals can still be used to determine the sample rate. Digital Receivers that process AES data streams could also be used in combination with the frequency detection circuit to automatically determine the sample rate. In this case, the operation would preferably be a little different because the MCLK signal that is generated by the digital receiver is a fixed rate (e.g., 256*(sample rate)), and thus there would be no MCLK to LRCK rate detect circuit. All the elements above—ADC, DAC, CODEC, and digital receiver—can be referred to generically as "data converters," and any claim referring to a digital converter should be construed to encompass any such circuit which otherwise satisfies the claim elements set forth therein. Further, the recitation of one of these terms in the preamble should be construed as a use environment and not as a limitation upon the claims. In any instance, the specific elements of the embodiments described above can often be replaced by other elements which can perform the described functions. It is therefore, contemplated that the claims will cover such modifications or embodiments.

Figure 12:
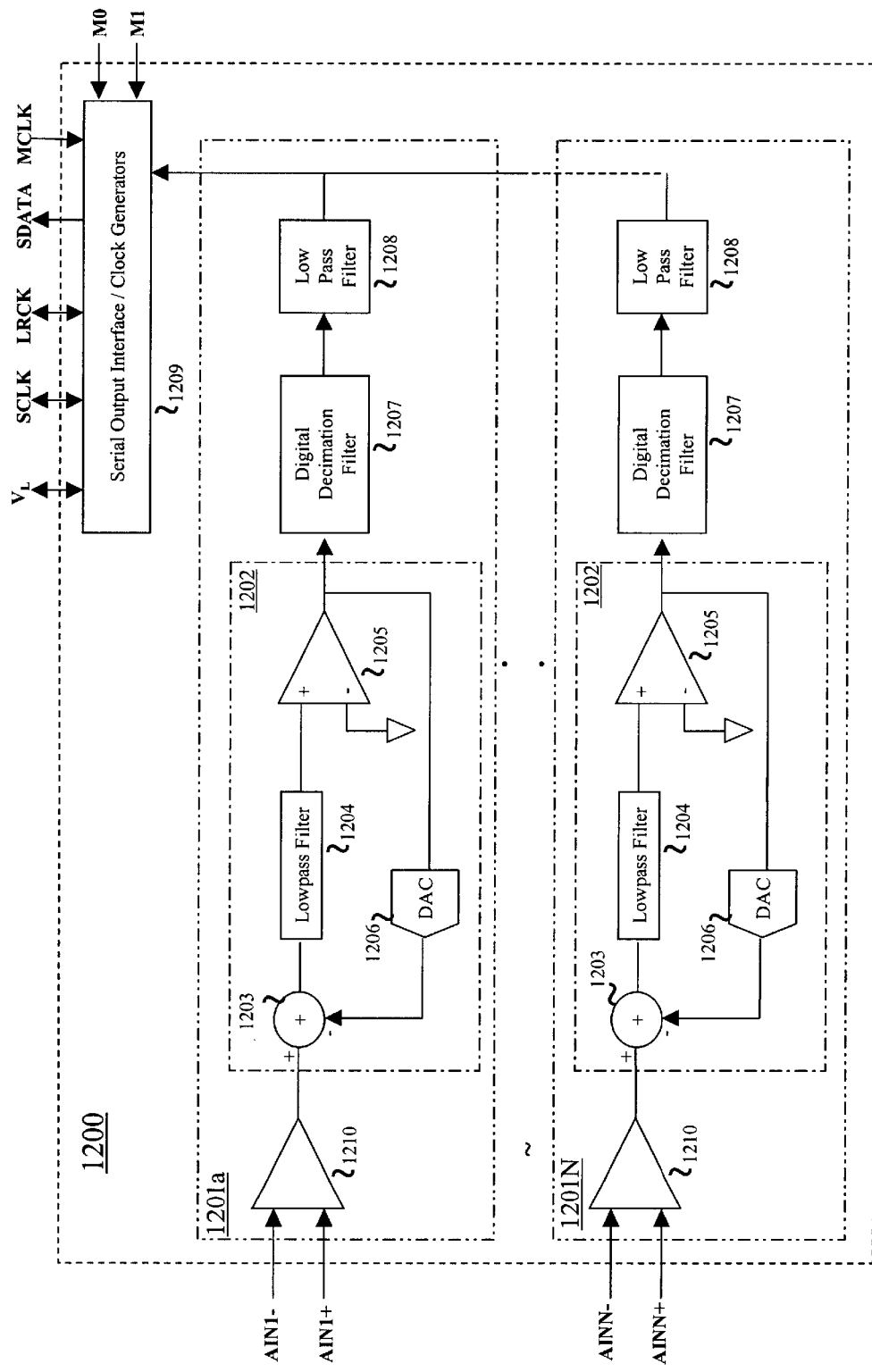
FIG. 12 is a block diagram of an exemplary analog to digital converter embodying the principles of the present invention.

FIG. 12 is a high-level functional block diagram of a single-chip audio analog-to-digital converter (ADC) 1200 suitable for practicing the principles of the present invention. For illustrative purposes, ADC 1200 is a delta-sigma ADC, although the present inventive principles are applicable to other types of ADCs, as well as DACs and Codecs as discussed above.

ADC 1200 includes N conversion paths 1201a . . . N, two of which 1201a and 1201N are shown for reference, for converting N channels of differential analog audio data respectively received at analog differential inputs AINN+/−, where N is an integer of one (1) or greater. The analog inputs for each channel are passed through an input gain stage 1210 and then a delta-sigma modulator 1202.

Each delta-sigma modulator 1202 is represented in FIG. 12 by a summer 1203, low-pass filter 1204, comparator (quantizer) 1205, and DAC 1206 in the delta-sigma feedback loop. The outputs from delta-sigma modulators 1202 are passed through a digital decimation filter 1207, which reduces the sample rate, and a low pass filter 1208. Delta sigma modulators 1202 sample the analog signal at an oversampling rate and output digital data in either single-bit or multiple-bit form, depending on the quantization, at the oversampling rate. The resulting quantization noise is shaped and generally shifted to frequencies above the audio band.

The resulting digital audio data are output through a single serial port SDATA of serial output interface/clock generation circuitry 1209, timed with the serial clock (SCLK) signal and the left-right clock (sample) (LRCLK) previously described. In the slave mode, the SCLK and LRCLK signals are generated externally and input to ADC 1200 along with the master clock (MCLK) signal. For the slave mode, the inventive speed-mode detection circuitry and methods described above determine the appropriate speed mode and generate the appropriate internal master clock MCLK_INT.

Data decoders and encoders embodying the principles of the present invention, such as DAC 200 and ADC 1200, also support a master mode. In the master mode, the external master clock (MCLK) signal is received from an external source and thereafter utilized on-chip to generate the SCLK and LRCK signals, which are then output from the given DAC 200, ADC 1200, or CODEC along with the corresponding data.

Figure 13:
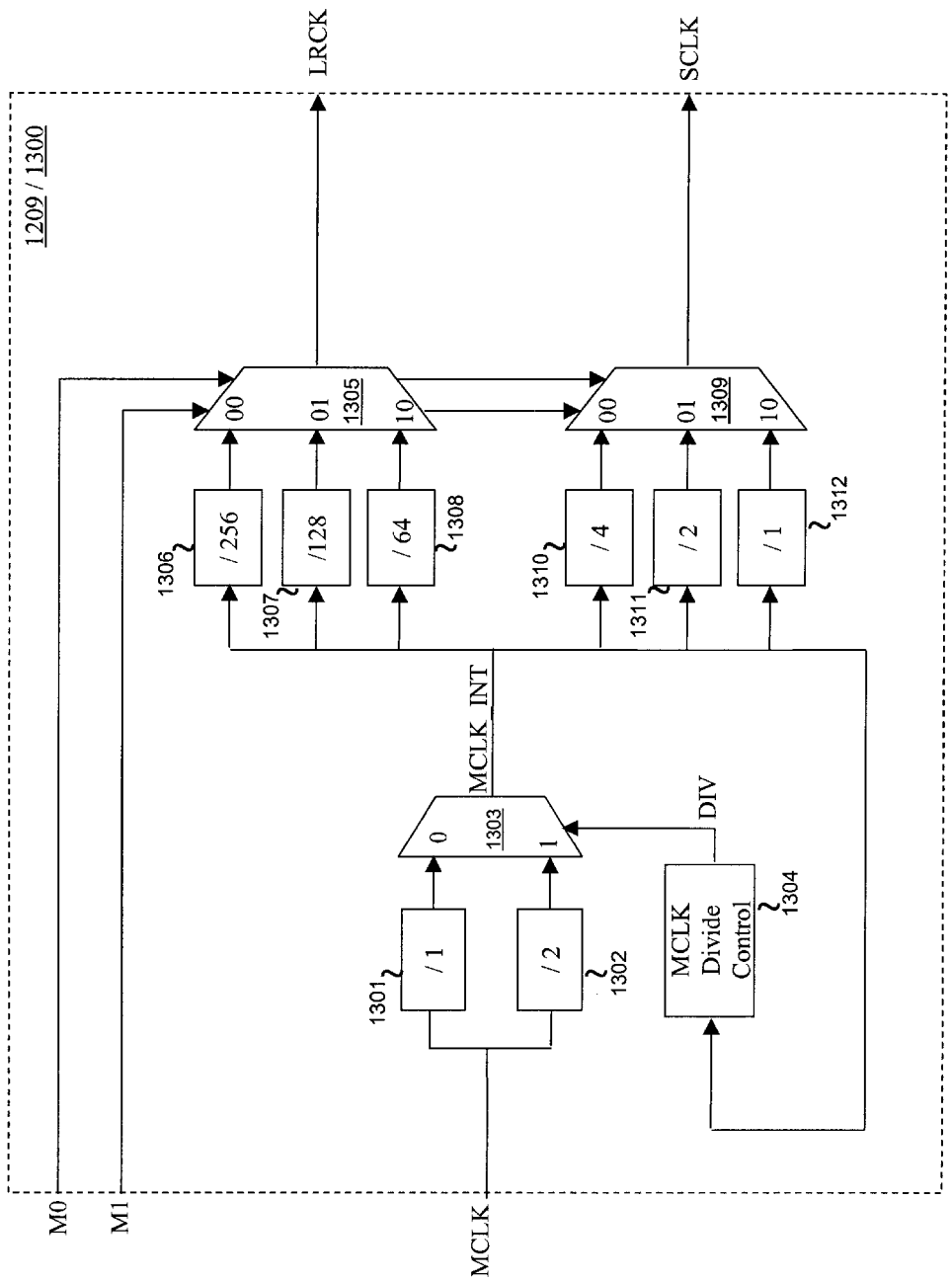
FIG. 13 is a block diagram of exemplary clock generation circuitry suitable for generating output clocks during master mode operations of the analog to digital converter of FIG. 12.

Exemplary master mode clock generation circuitry 1300 embodying the principles of the present invention is shown in FIG. 13. In the example of ADC 1200, master mode clock generation circuitry 1300 is disposed within serial output interface/clock generation block 1209 of FIG. 2, although the location of master mode clock generation circuitry 1300 may vary depending on the chip configuration.

In the embodiment of FIG. 13, master mode clock generation circuitry 1300 generates LRCLK and SCLK signals of selected frequencies from a 12.288 MHz MCLK_INT signal derived from an MCLK signal of either 24.576 MHz or 12.288 MHz. In alternate embodiments, the frequency of the MCLK_INT signal and/or the supported frequencies of the MCLK signal may vary depending on the actual application. In addition, in the embodiment of FIG. 13, the LRCLK and SCLK signals are being generated with an oversampling ratio (SCLK to LRCLK) of sixty-four (64), although this oversampling ratio is also an exemplary ratio.

For the MCLK_INT signal of 12.288 MHz, an MCLK signal of 12.288 MHz remains undivided while an MCLK signal of 24.576 MHz is divided by two. In FIG. 13, this process is represented in block form by a divide-by-one divider 1301, a divide-by-two divider 1302, and a multiplexer 1303. Multiplexer 1303 selects the output of either divide-by-one divider 1301 or divide-by-two divider 1302 in response to the divide control (DIV) signal generated by MCLK divide control circuitry 1304. MCLK divide control circuitry 1304 is discussed in further detail below.

Master mode clock generation circuitry 1300 also receives two mode control signals M0 and M1, which select the output frequencies for the LRCLK and SCLK signals for a given speed mode. Specifically, the M0 and M1 signals control multiplexer 1305 which selects a LRCLK signals of the required frequency from the output of either divide-by-two-hundred-fifty-six (/256) divider 1306, divide-by-one-hundred-twenty-eight (/128) divider 1307 or divide-by-sixty-four (/64) divider 1308. The inputs of dividers 1306–1308 are driven by the MCLK_INT signal from input selector 1303. Multiplexer 1309, also under the control of the M0 and M1 signals, selects an SCLK signal of the required frequency from the output of divide-by-four (/4) divider 1310, divide-by-two (/2) divider 1311 or divide-by-one (/1) divider 1312. Dividers 1310–1312 also divide-down the frequency of the MCLK_INT signal. For the illustrated embodiment of master mode clock generation circuitry 1300, the decoding of the M0 and M1 signals is as shown in Table 3.

TABLE 3

| M1 | M0 | Master/Slave | Speed Mode | LRCK | SCLK |
|----|----|--------------|------------|------|------|
| 0 | 0 | Master | Single (48 kHz) | 48 kHz | 3.072 Mhz |
| 0 | 1 | Master | Double (96 kHz) | 96 kHz | 6.144 Mhz |
| 1 | 0 | Master | Quad (192 kHz) | 192 kHz | 12.288 Mhz |
| 1 | 1 | Slave | Auto Detect | — | — |

Figure 14:
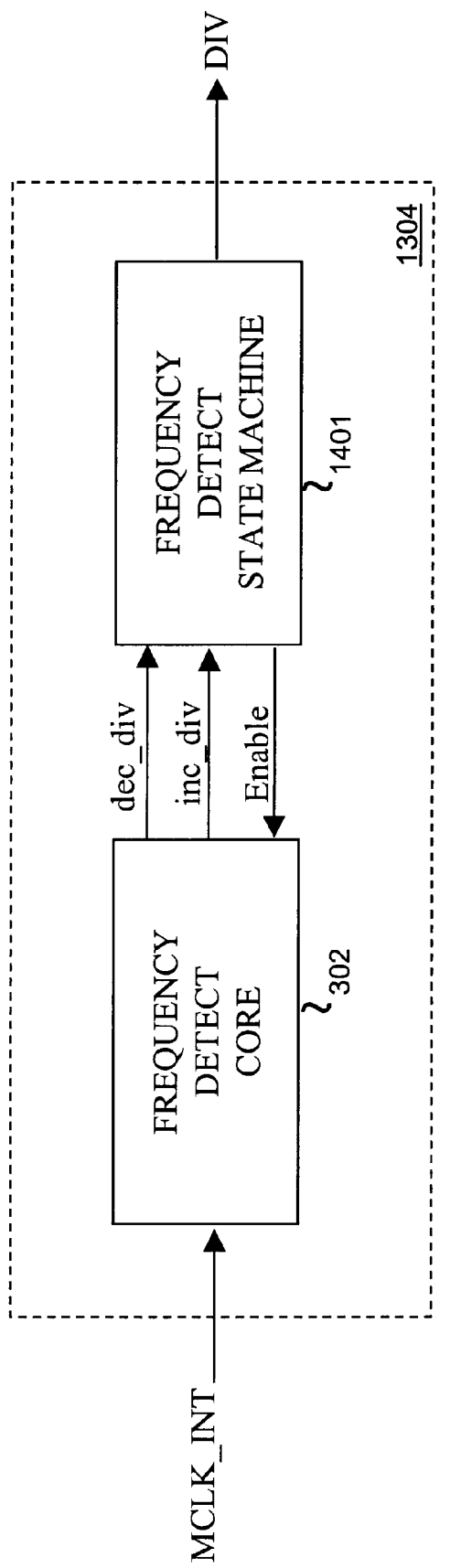
FIG. 14 is a more detailed block diagram on an exemplary embodiment of the master clock divide control circuitry of FIG. 13.

FIG. 14 is a more detailed block diagram of MCLK divide control circuitry 1304 of FIG. 13. MCLK divide control circuitry 1304 includes frequency detect core 302, described above in conjunction with FIGS. 3 and 6–9, and a frequency detect state machine 1401. Generally, frequency detect core 302 monitors the frequency of the MCLK_INT signal output from multiplexer 1303 of FIG. 13 and provides the control signals inc_div and dec_div signals which indicate to frequency detect state machine 1401 whether MCLK and MCLK_INT are equal in frequency. In response, frequency detect state machine 1401 enables frequency detect core 302 and generates the DIV signal of FIG. 13.

Figure 15:
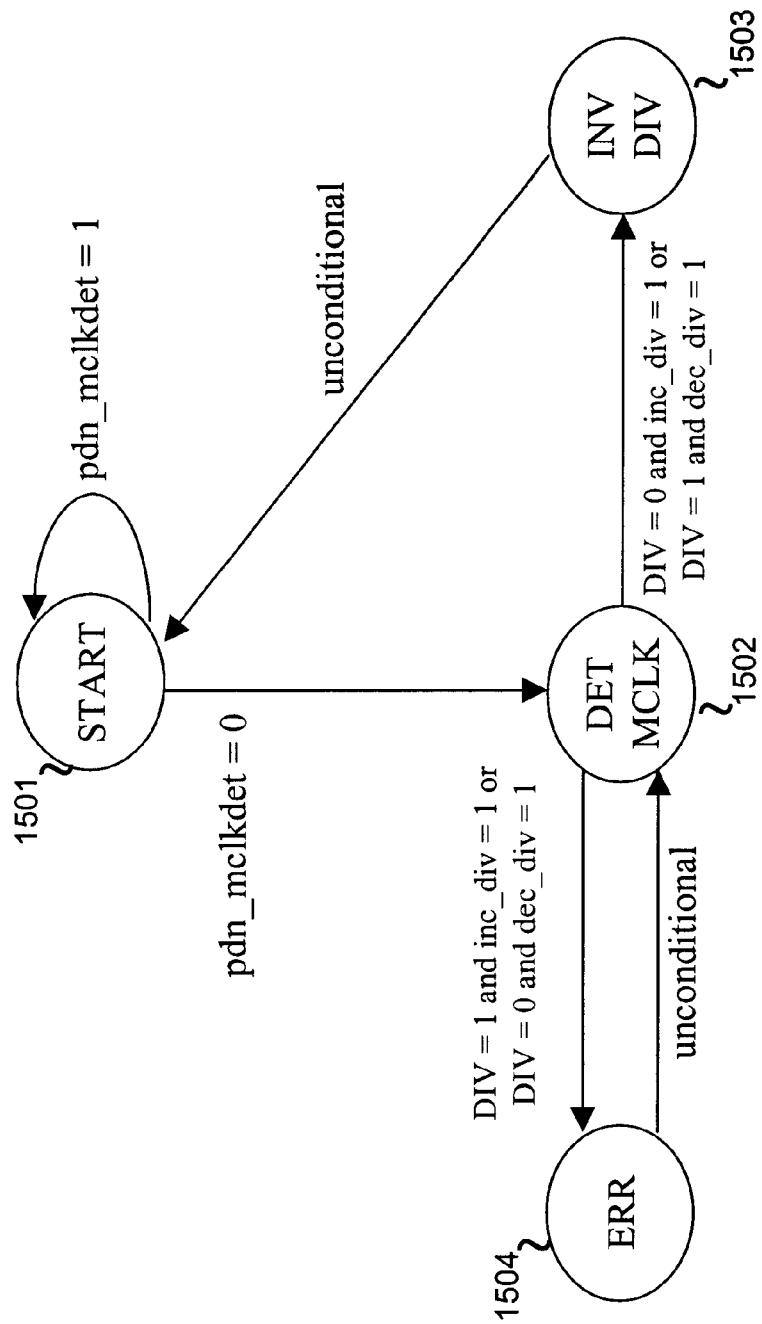
FIG. 15 is a state diagram illustrating exemplary operations of the master clock divide control circuitry of FIG. 14.

Exemplary operations of frequency detect state machine 1401 are illustrated in the state diagram of FIG. 15. In the powered-down state of ADC 1200 (pdn_mclkdet=1), frequency detect state machine 1401 remains at START state node 1501. At power-up (pdn_mclkdet=0) of ADC 1200, frequency state machine 1401 transitions to the Detect MCLK state at (DET_MCLK) state node 1502. At DET_MCLK state node 1502, counter 620 of FIG. 6 in this embodiment of frequency detect core 302 (see FIG. 3) counts eight (8) periods of the MCLK_INT signal fed-back from multiplexer 1303 of FIG. 13 and then initiates the generation of the control signals of FIGS. 7–9. In response, frequency detect core 302 feeds-back the control signals dec_div and inc_div to frequency detect state machine 1401.

If the current state of DIV signal is at a logic zero (0) at state node 1502, and the inc_div and inc_div signals are both equal to zero (0), then the frequency of the MCLK_INT signal is equal to 12.288 MHz (i.e., $f_{MCLK\_INT}=f_{MCLK}=$ 12.288 MHz) and therefore no division or only a divide-by-one division is required. In this case, the DIV signal remains at a logic zero (0) and multiplexer 1303 of FIG. 13 continues to pass the 12.288 MHz MCLK signal from divide-by-one divider 1301 as the MCLK_INT signal.

Alternatively, if at DET_MCLK state node 1502, the DIV signal is at zero (0), the inc_div signal is active (i.e. at a logic 1) and the dec_div signal is inactive (i.e. at a logic 0), then by implication the MCLK and MCLK_INT signals are both at 24.576 MHz. Consequently, frequency detect state machine 1401 transitions to the invert DIV (INV_DIV) state node 1503 and inverts the DIV signal, in this case from a logic zero (0) to a logic one (1). In turn, multiplexer 1303 selects the output of divide-by-two divider 1302 of FIG. 13 to set the MCLK_INT signal at 12.288 MHz. Frequency detect state machine 1401 then returns to START state node 1501.

In the event that at DET_MCLK state node 1502, the DIV signal is at a logic one (1), the dec_div signal is active (i.e. at a logic 1) and the inc_div signal is inactive (i.e. at a logic 0), then the MCLK signal is at 12.288 MHz and the MCLK_INT signal is at 6.122 MHz. Frequency detect state machine 1401 therefore transitions to INV_DIV state node 1502 and the DIV signal is inverted, in this case from a logic one (1) to a logic zero (0). Consequently, multiplexer 1303 selects the output of divide-by-one divider 1301 of FIG. 13 as the MCLK_INT signal at 12.288 MHz. Frequency detect state machine 1401 then returns to START state node 1501.

An error occurs at ERR state node 1504 whenever the DIV signal is at logic zero (0) and the dec_div signal is at logic one (1) or the DIV signal is at logic one (1) and the inc_div signal is at logic one (1). In particular, the state in which the DIV signal is at logic zero (0) and the dec_div signal is at logic one (1) indicates that the frequency of the MCLK signal is substantially lower than 12.288 MHz such that an MCLK_INT signal at 12.288 MHz cannot be generated. Similarly, the state in which both the DIV signal and the inc_div signal are at logic one (1) indicates that the frequency of the MCLK signal is substantially greater that 24.576 MHz such that a 12.288 MHz MCLK_INT signal cannot be generated with the available divisors. Upon detection of an error, frequency detect state machine 1401 remains at ERR state node 1504 for one cycle of the MCLK_INT signal and then returns to DET_MCLK state node 1501.

In the master mode, once the MCLK_INT frequency is set at 12.288 MHz, the M0 and M1 signals control the generation of the corresponding LRCLK and SCLK signals for the selected speed mode as described above. The LRCLK and SCLK are then output from serial interface/clock generation block 1209 of FIG. 12 along with the corresponding analog data.

Figure 16:
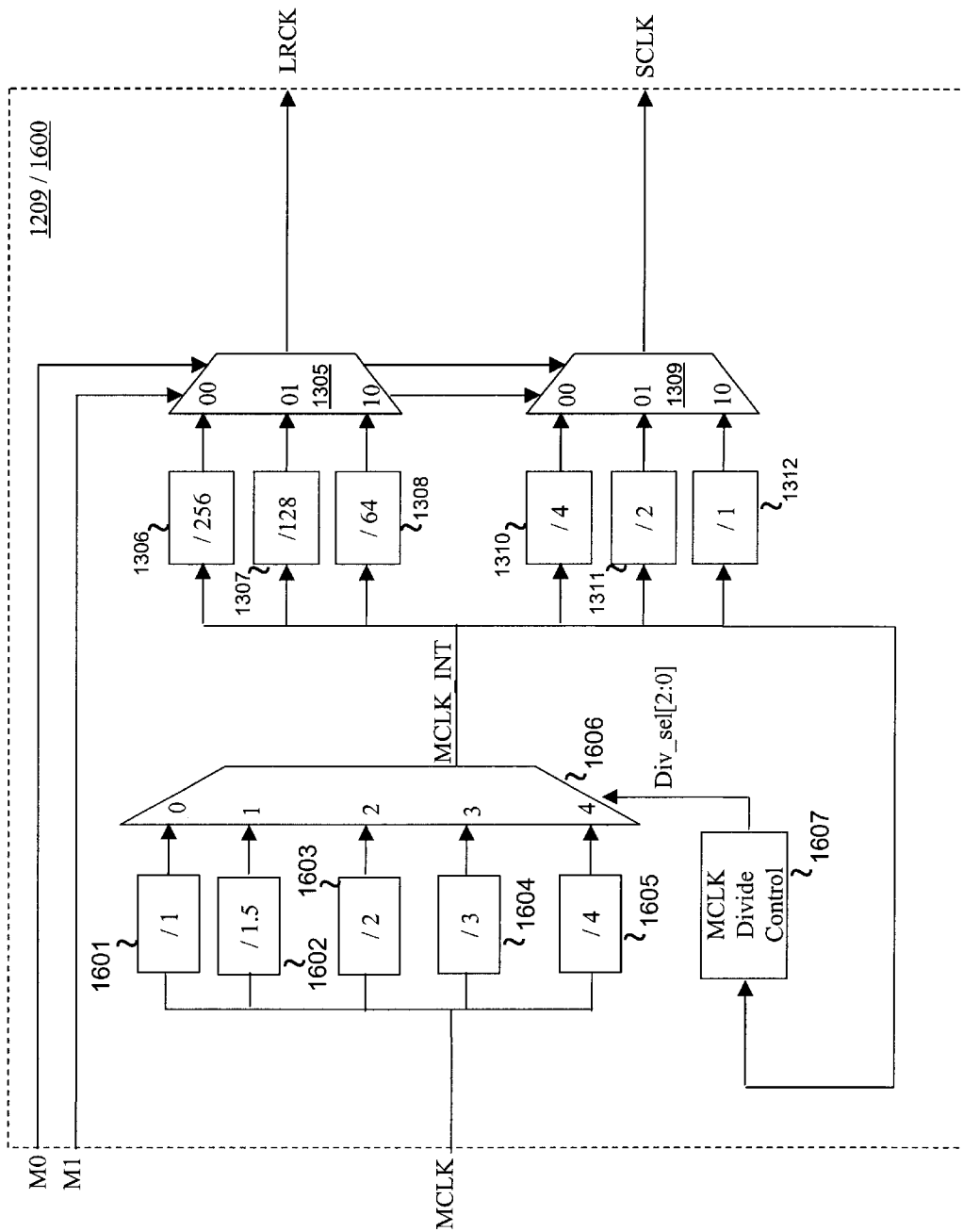
FIG. 16 is a block diagram of exemplary alternate clock generation circuitry suitable for generating output clocks during master mode operations of the analog to digital converter of FIG. 12.

The principles of the present invention are extended to embodiments of clock generation circuitry 1209 which support more than two MCLK divisor values, as demonstrated by the exemplary five (5) MCLK divisor clock generator 1600 of FIG. 16. Clock generator 1600 includes five dividers 1601–1605 for respectively dividing the MCLK signal by one (1), one and one half (1.5), two (2), three (3) or four (4) to generate the MCLK_INT signal of the desired frequency. The output of one of dividers 1601–1605 is selected by a five to one (5:1) selector 1606 in response to the value of a set of divide select bits (Div_sel) generated MCLK divide control circuitry 1607. An exemplary state machine for utilization in MCLK divide control circuitry 1607 is discussed below in conjunction with FIG. 17. Multiple divisors increase the number of supported MCLK and/or MCLK_INT frequencies. For example, for a 12.288 MHz MCLK_INT signal, an MCLK signal of 49.152 MHz can be divided by a divisor of four (4) by selecting the output of divider 1604, and so on.

Figure 17:
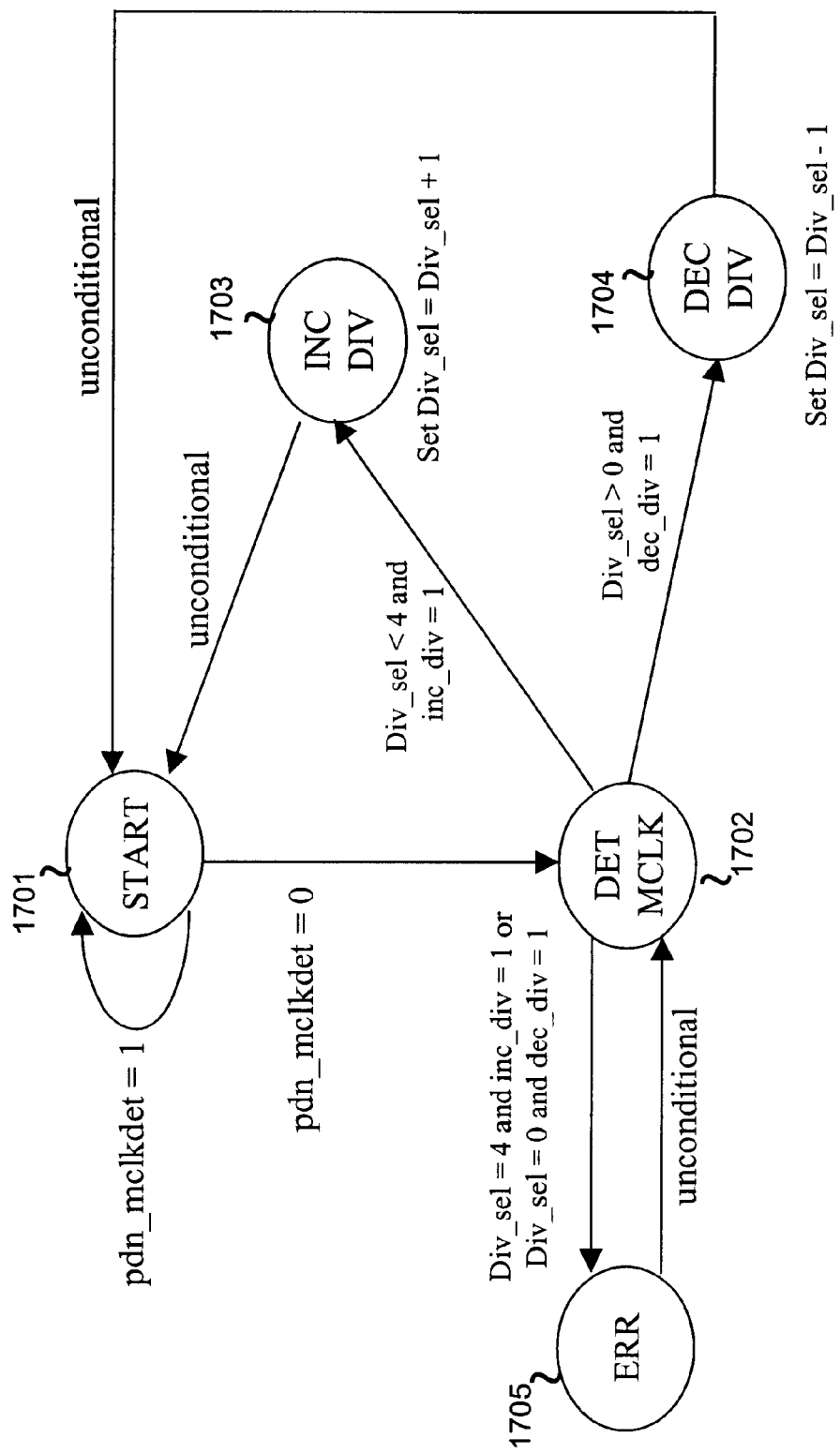
FIG. 17 is a state diagram illustrating exemplary operations of an alternate embodiment of the master clock divide control circuitry of FIG. 14 and suitable for utilization in the alternate clock generation circuitry of FIG. 16.

FIG. 17 is a state diagram representing exemplary operations of an alternate embodiment of frequency detect state machine 1401 suitable for utilization in MCLK divider control circuitry 1607 of FIG. 16. In the powered-down state of ADC 1200 (pdn_mclkdet=1), frequency detect state machine 1401 remains at START state node 1701. At ADC 1200 power-up (pdn_mclkdet=0), frequency state machine 1607 transitions to the Detect MCLK (DET_MCLK) state node 1702. At DET_MCLK state node 1702, counter 620 of FIG. 6 in this embodiment of frequency detect core 302 (see FIG. 3) counts eight (8) periods of the MCLK_INT signal fed-back from multiplexer 1606 of FIG. 16 and then initiates the generation of the control signals of FIGS. 7–9. In response, frequency detect core 302 feeds-back the control signals dec_div and inc_div to frequency detect state machine 1401.

In the embodiment of state machine 1401 shown in FIG. 17, if the inc_div and inc_div signals are both equal to zero (0), then MCLK_INT is at the desired frequency and Div_sel maintains its current value. In other words, the current selection from dividers 1601–1605 being made by selector 1606 of FIG. 16 remains the same.

Alternatively, if at DET_MCLK state node 1702, the value of the Div_sel bits is less than four (4) and the inc_div signal is active (i.e. at a logic 1), then the frequency of the MCLK_INT signal is too high. Therefore, at Increment Divisor (INC_DIV) state node 1703, the value Div_sel increments by one (1) such that selector 1606 selects the output of the divider 1601–1605 corresponding to the next highest available divisor. Frequency detect state machine 1401 then loops back to START state node 1701 and DET_MCLK state node 1702 and continues.

On the other hand, if at DET_MCLK state node 1702, the value of the Div_sel bits is greater than zero (0) and the dec_div signal is active (i.e. at a logic 1), then the frequency of the MCLK_INT signal is too low. Consequently, at Decrement Divisor (DEC_DIV) state node 1704, the value Div_sel decrements by one (1) such that selector 1606 selects the output of the divider 1601–1605 corresponding to the next lowest available divisor. Frequency detect state machine 1401 then loops back to START state node 1701 and DET_MCLK state node 1702 and continues.

An error occurs at ERR state node 1705 whenever the value of Div_sel bits has reached a four (4) and the inc_div signal is still active. In this case, the MCLK_INT signal frequency is still too high but a sufficiently high divisor is not available to divide down the MCLK signal to required MCLK_INT frequency. Similarly, an error occurs at ERR state node 1705 whenever the value of the Div_sel bits has reached zero (0) and the dec_div signal is still at one (1). Here, the current frequency of the MCLK_INT signal is too low however the current MCLK signal frequency is also too low to generate the desired MCLK_INT frequency.

While a particular embodiment of the invention has been shown and described, changes and modifications may be made therein without departing from the invention in its broader aspects, and, therefore, the aim in the appended claims is to cover all such changes and modifications as fall within the true spirit and scope of the invention.

What is claimed is:

1. A data converter system comprising:

first and second signal paths receiving an input signal having an input frequency, the first signal path dividing the input frequency by a first divisor and the second signal path dividing the input frequency by a second divisor, the second divisor greater than the first divisor;

a selector for selecting between an output of the first signal path and an output from the second signal path in response to a state of a control bit;

control circuitry for monitoring a selector output signal frequency and a current state of the control bit and selectively resetting the state of the control bit to set the selector output frequency to a desired frequency; and data conversion circuitry for converting a received data stream from a first form to a second form operating at the selector output frequency.

2. The data converter system of claim 1 wherein the control circuitry is operable to:

if the selector output signal frequency is equal to the desired frequency, maintain the current state of the control bit:

if the selector output signal frequency is less than the desired frequency, invert the current state of the control bit; and if the selector output signal frequency is greater than the desired frequency, invert the current state of the control bit.

3. The data converter system of claim 1 wherein the selector is operable to select the output of the first signal path in response to a first state of the control bit and select an output of the second signal path in response to a second state of the control bit and the control circuitry is operable to:
  if the selector output signal frequency is equal to the desired frequency, maintain the current state of the control bit:
    if the selector output signal frequency is greater than the desired frequency and the control bit is in the first state, resetting the control bit to the second state; and
    if the selector output signal frequency is less than the desired frequency and the control bit is in the second state, resetting the control bit to the first state.

4. The data converter system of claim 1 further comprising clock signal generation circuitry operable to selectively divide the selector output signal frequency by a selected divisor to generate an output clock signal in a master mode.

5. The data converter system of claim 4 wherein the clock signal generation circuitry selectively divides the selector output signal frequency by a divisor selected in response to a received mode control signal.

6. The data converter system of claim 1 wherein the data converter comprises an analog to digital converter.

7. The data converter system of claim 1 wherein the data converter comprises a digital to analog converter.

8. The data converter system of claim 1 wherein the desired frequency of the selector output signal comprises a fixed frequency.

9. A clock generator comprising:
  divider circuitry for dividing a frequency of an input clock signal by selected divisors to generate a plurality of internal clock signals of corresponding clock frequencies;
  divider control circuitry for selecting one of the plurality of internal clock signals generated by the divider circuitry as an internal master clock signal of a selected internal master clock frequency, the divider control circuitry including a frequency detector for monitoring the internal master clock frequency and generating a control bit for selecting the one of the plurality of internal clock signals, and operable to:
    if the internal master clock frequency is equal to a desired internal master clock frequency, maintain a selection of a current internal clock signal as the internal master clock signal;
    if the internal master clock frequency is less than the desired internal master clock frequency, selecting an internal clock signal having a clock frequency corresponding to a lower divisor as the internal master clock signal; and
    if the internal master clock frequency is greater than the desired internal master clock frequency, selecting an internal clock signal having a clock frequency corresponding to a higher divisor as the internal master clock signal; and
  output clock generation circuitry for receiving the selected internal master clock signal and generating at least one output clock of a selected frequency by selectively dividing the selected internal master clock frequency.

10. The clock generator of claim 9 wherein the output clock generation circuitry generates the at least one output clock frequency during master mode operations of the data converter.

11. The clock generator of claim 10 wherein the master mode operations of the data converter are controlled by a received mode control signal.

12. The clock generator of claim 9 wherein the output clock generation circuitry comprises:
  second divider circuitry for selectively dividing the internal master clock frequency by a set of selected divisors to generate a plurality of output signals with corresponding output frequencies; and
  at least one selector for selecting at least one of the output signals for output from the data converter during master mode operations.

13. The clock generator of claim 9 wherein the input signal comprises an audio master clock and the at least one output clock comprises a selected one of an audio sample clock and an audio serial clock.

14. The clock generator of claim 9 wherein the data converter comprises an analog to digital converter.

15. The clock generator of claim 9 wherein the data converter comprises a digital to analog data converter.

16. The clock generator of claim 9 wherein the internal master clock frequency is a fixed frequency.

17. A method of generating at least one output clock from an input clock signal having an input clock frequency comprising:
  selectively dividing the input clock frequency of the input clock signal by a selected one of a plurality of divisors to generate a plurality of clock signals of respective frequencies;
  selecting in response to a state of a control bit between the clock signals to generate an internal master clock signal having an internal master clock frequency;
  detecting a current internal master clock frequency and a current state of the control bit and selectively resetting the state of the control bit to selectively vary the internal master clock frequency comprising:
    if the internal master clock frequency is equal to a desired internal master clock frequency continuing to divide by a current one of the divisors;
    if the internal master clock frequency is less than the desired internal master clock frequency selecting a one of the plurality of clock signals associated with a smaller corresponding divisor; and
    if the internal master clock frequency is greater than the desired internal master clock frequency selecting a one of the plurality of clock signals associated with a higher corresponding divisor; and
  selectively dividing the internal master clock frequency of the internal master clock to generate the at least one output clock of a selected output clock frequency during a master mode.

18. The method of claim 17 wherein selectively dividing the internal master clock frequency comprises selecting the output clock frequency during the master mode with at least one mode control signal.

19. The method of claim 17 wherein the input clock signal comprises an audio master clock and the at least one output clock signal is selected from the group consisting of audio sampling and audio serial clocks.

20. The method of claim 17 further comprising the step of converting an input data stream from a first form to a second form.

* * * * *